US012812335B2

(12) United States Patent
Tsiatsikas et al.

(10) Patent No.: US 12,812,335 B2
(45) Date of Patent: Nov. 24, 2026

(54) METHOD AND SYSTEM FOR EXPOSING MALICIOUS MOBILE ACTIVITY BY EXPLOITING SIGNAL-BASED GESTURES

(71) Applicant: Unify Patente GmbH & Co. KG, Munich (DE)

(72) Inventors: Zisis Tsiatsikas, Salonika (GR); Manfred Kehr, Munich (DE); Thomas Lederer, Herrsching (DE); Andrew Hutton, Nottingham (GB)

(73) Assignee: Unify Beteiligungsverwaltung GmbH+CO.Kg, Munich (DE)

( * ) Notice: Subject to any disclaimer, the term of this patent is extended or adjusted under 35 U.S.C. 154(b) by 235 days.

(21) Appl. No.: 18/912,971

(22) Filed: Oct. 11, 2024

(65) Prior Publication Data

US 2025/0133371 A1 Apr. 24, 2025

(30) Foreign Application Priority Data

Oct. 24, 2023 (EP) .................................... 23205550

(51) Int. Cl.
*H04W 4/029* (2018.01)
*H04W 4/90* (2018.01)

(52) U.S. Cl.
CPC ............. *H04W 4/029* (2018.02); *H04W 4/90* (2018.02)

(58) Field of Classification Search
CPC ....... H04W 4/029; H04W 4/90; H04W 12/68; H04W 76/50; H04W 4/02; H04W 64/00; H04W 84/042; H04W 12/122; H04W 12/63; H04W 12/08; H04W 8/16; H04W 12/12; H04W 60/04; H04W 12/02; H04W 48/04; H04W 4/025; H04W 48/02; H04W 4/023; H04W 12/104; H04W 4/38; H04W 36/0038; H04W 4/027; H04W 12/126; H04W 12/30; H04W 12/65; H04W 52/0254; H04W 8/02; H04W 12/64; H04W 12/086; H04W 12/40; G06F 3/017;

(Continued)

(56) References Cited

U.S. PATENT DOCUMENTS

| | | | |
|---|---|---|---|
| 7,187,764 B2 | 3/2007 | Ruetschi | |
| 8,718,253 B2 | 5/2014 | Sharland et al. | |
| 9,674,365 B2 | 6/2017 | Gilg et al. | |
| 10,219,124 B2 | 2/2019 | Garbin et al. | |
| 10,250,661 B2 | 4/2019 | Totzke et al. | |

(Continued)

FOREIGN PATENT DOCUMENTS

| | | |
|---|---|---|
| WO | 2016191497 A1 | 12/2016 |
| WO | 2017106775 A1 | 6/2017 |

OTHER PUBLICATIONS

European Search Report for European Application No. 23205550.9 dated Apr. 8, 2024.

(Continued)

*Primary Examiner* — Nimesh Patel

(57) ABSTRACT

A method and a system for exposing malicious mobile activity by exploiting signal-based gestures can be provided so that an emergency service can detect an emergency incident in an area and communicate with one or more user(s) of one or more mobile end devices in the incident area and instruct the one or more users to perform a gesture with their end device(s). Then the signal and/or location data of the one or more user end device(s) in the incident area can be analyzed to verify whether the one or more user(s) in the incident area are non-malicious or malicious actors.

19 Claims, 3 Drawing Sheets

(58) Field of Classification Search
CPC .......... G06F 3/013; G06F 3/012; G06F 21/88; G06F 21/554; G06F 21/32; G06F 21/00; G06F 2221/2111; H04L 12/189; H04L 63/1416; H04L 67/535; H04L 63/107; H04L 63/0492; H04L 63/0876; H04L 9/0872; H04L 2012/2841; H04L 63/0421; H04L 63/105; H04L 63/1441; H04L 9/3247; H04L 43/02; G06Q 30/0267; G06Q 30/0255; G06Q 50/265; G06Q 30/0261; G06Q 20/40145; G01S 5/0244; G01S 19/42; G01S 19/06; G01S 5/0027; G01S 3/325; G01S 5/06; G01S 17/06; G01S 5/10; G06V 10/82; G06V 40/172; G06V 40/20; G06V 10/809; G06V 10/765; H04M 1/72463; H04M 1/724631; H04M 1/72454; H04M 1/72457; H04M 2250/12; H04M 2250/52; H04M 1/6091; H04M 2215/32; H04M 2242/04; H04M 1/66; H04M 1/72421; H04M 2203/6027; H04M 2215/0148; H04M 11/04
See application file for complete search history.

(56) References Cited

U.S. PATENT DOCUMENTS

| | | | | |
|---|---|---|---|---|
| 10,498,779 | B2 | 12/2019 | Rist et al. | |
| 10,681,090 | B2 | 6/2020 | Horvath | |
| 10,764,769 | B2 | 9/2020 | Baldwin et al. | |
| 2002/0077083 | A1* | 6/2002 | Zellner | G06Q 30/02 455/414.1 |
| 2013/0225117 | A1* | 8/2013 | Giacoletto | H04W 4/06 455/404.2 |
| 2016/0302050 | A1* | 10/2016 | Blando | H04W 4/02 |
| 2020/0153796 | A1* | 5/2020 | Lin | H04W 4/38 |
| 2022/0036721 | A1* | 2/2022 | Wu | G08B 27/001 |
| 2022/0132290 | A1* | 4/2022 | Kempel | H04L 67/306 |
| 2023/0195866 | A1* | 6/2023 | Hudgins | G06F 21/32 713/186 |

OTHER PUBLICATIONS

Charles R. Qi, et al. "PointNet: Deep Learning on Point Sets for 3D Classification and Segmentation" arXiv:1612.00593v2 [cs.CV] Apr. 10, 2017.

* cited by examiner

METHOD AND SYSTEM FOR EXPOSING MALICIOUS MOBILE ACTIVITY BY EXPLOITING SIGNAL-BASED GESTURES

CROSS-REFERENCE TO RELATED APPLICATIONS

The present application claims priority to European Patent Application No. EP23205550.9 filed on Oct. 24, 2023.

FIELD

The present invention relates to a method and a system for exposing malicious mobile activity by exploiting signal-based gestures. Thereby, an emergency service detects an emergency incident in an area and communicates with one or more user(s) of a mobile end device in the incident area and instructing the one or more user(s) to perform a gesture with their end device(s). Then the signal and/or location data of the one or more user end device(s) in the incident area are analyzed to verify the one or more user(s) in the incident area as non-malicious or malicious actors.

BACKGROUND

One of the most serious problems in the telecom industry concerns the detection and prevention of robocalls. The latter correspond to automated calls associated usually with telemarketing content which are on the rise since the last years. These types of calls are most often triggered by malicious entities which try to mislead their victims.

SUMMARY

In the case of emergency calls, malicious robocalling can be a significant problem. In such cases each call is important, and thus, it is very crucial to eliminate the risk of consuming resources on the side of an emergency service, for example, on part of a public safety answering point (PSAP) without there being a real emergency incident. This is different from the traditional case of Telephony Denial of Service Attacks (TDoS) as the malicious actor usually tries to be as silent as possible without raising the alarms of the underlying security mechanisms. The aim of the robocall is to make the victim believe that on the other side of the line there is a real person.

A method and a corresponding system for exposing malicious mobile activity by exploiting signal-based gestures can be provided. Embodiments of a method and a system which analyzes a (mobile) device signal data to infer if a person needs help in the case of an emergency incident or even to expose a robocall can be provided, for example.

Embodiments of a method for exposing malicious mobile activity by exploiting signal-based gestures is provided. Some embodiments of the method can include the steps of:

- detecting, by an emergency service, an emergency incident in an area;
- communicating, by the emergency service, with one or more user(s) end device(s) in the incident area and instructing one or more user(s) to perform a first gesture with the one or more user(s) end device(s) in the air;
- receiving upon request, by the emergency service, signal and/or location data from a carrier regarding the one or more user(s) end device(s) for a predetermined amount of time;

- analyzing, by the emergency service, the signal and/or location data received by the carrier to identify if the positioning data inferred from the signal analysis provide enough information to recognize the first gesture which was performed by the one or more user(s) end device(s) in the incident area;
- communicating, by the emergency service, with one or more user(s) in the incident area to perform a second or any further gesture by moving the one or more user(s) end device(s) in the air, if the signal analysis does not offer enough information to recognize the first gesture, and performing again the steps of receiving and analyzing signal and/or location data in regard to the second or any further gesture; and
- verifying, by the emergency service, the one or more user(s) in the incident area as non-malicious and proceeding with standard emergency handling, if the signal analysis provides enough information to recognize the first gesture, the second or any further gesture.

Embodiments can be provided to build over the concept of high position accuracy which are possible with the new standards (e.g. 5G, 6G, etc.). Using these data, embodiments can be configured and/or implemented to identify the position and the motion of the device equipment in order to recognize specific gestures performed in the air by using the signal data of a device retrieved from the carrier (provider).

We determined that these wireless standards can offer the flexibility to track the position changes far more accurate than this is done today. More specifically, it is expected that the wireless technology will reach a high accuracy in the level of in meter range and less.

Embodiments of our method can be implemented so that the underlying service can analyze only the signal data of a device to identify if a user has formed a requested gesture. In some embodiments of the method, there may not be (or wont' be) a need to establish a data communication channel with the user in order to retrieve position data from the device. It is possible to directly ping the provider to provide the positioning data and perform calculations over the data set of position points.

It should be noted that embodiments can be used as one of the steps of a multilayer security solution that will tackle robocalls. This is considered a "sine qua non", as a person may not be in position to perform a specific movement by holding the device. This may happen because a person is impaired, or because there is a very critical emergency situation on which the user cannot move, say, for example, after a car accident. This is always related to other sources of information that can be used to verify the environment, e.g. sensors indicate that there is a car accident, etc. On the other, it is expected that in most of the cases a simple motion of the device will be possible, so this covers the majority of the use cases.

Embodiments can utilize known methods to calculate the user equipment (UE) or user device positioning data from signal data that have been retrieved from the provider. UE is a term used in wireless communications (e.g. LTE, 4G, 5G or 6G and higher) to describe a mobile device, such as a smartphone, tablet, laptop, or any other type of wireless device that is used to access a network. This can be done using methods like the Uplink Time Difference of Arrival (UTDOA or U-TDOA) or Enhanced Observed Time Difference (EOTD or E-OTD), for example. EOTD is a method for locating mobile terminals in GSM (Global System for Mobile Communications) networks. It is often more accurate than the Cell-ID method but requires complex additional installations in the network and a certain minimum density of base stations. Position determination can achieve an accuracy of up to 25 meters (m).

Often, position determination can take place in the following steps. First, the terminal determines the differences in signal propagation times between its own location and at least two neighboring base stations. This is done by observing the arrival times of normal bursts; special signals are not required for this. In parallel, special hardware in the network, the LMU (Location Measurement Unit), measures the propagation time differences of the same signals. The delay differences determined by the mobile station are then transmitted to the LMU which can calculate an approximate position from the mobile station's measurements and its own measurements.

In Universal Mobile Telecommunications System (UMTS)-based systems, the corresponding system can be called Observed Time Difference of Arrival (OTDOA). The UTDOA method increases the positioning accuracy to a value better than 100 meters. As the name "uplink" suggests, it is the UMTS base stations that record and evaluate the location signal of the mobile device. In some countries like the USA, UTDOA is a possible method of transmitting positions in emergencies.

Embodiments can make use of such above-mentioned methods in order to prove that the data are enough to infer the requested shape with, for example, a pointnet etc., but in any case, tembodiments can directly exploit the three-dimensional positioning data of each UE that have been computed in the provider. According to Qi, C. R., Su, H., Mo, K., & Guibas, L. J. (2017), *Pointnet: Deep learning on point sets for 3d classification and segmentation. In Proceedings of the IEEE conference on computer vision and pattern recognition* from pages 652-660 (https://arxiv.org/pdf/1612.00593.pdf), a pointnet solution can provide a unified architecture for applications ranging from object classification, part segmentation, to scene semantic parsing. It directly takes point clouds as input and outputs either class labels for the entire input or per point segment/part labels for each point of the input.

The sounding reference signal (SRS) can be considered the uplink signal which is transmitted by a UE and received by a Base Station (BS) for uplink sounding purposes. Using the values of this signal or a set of values from different versions of this signal it is possible to localize a UE in the 3D axis. It is stressed that UTDOA is just an example of a method that could be used for the purpose of verifying the signal-based gesture performed by a UE. Other similar methods can be used as well. For instance, methods which are also based on SRS but avoid the timing synchronization costs can be utilized. Taking into account SRS provided by MATLAB software already offers a way to calculate simulation values. Similar values can be requested from the carrier in specific time frames in order to use them in the proposed method.

Optionally, the method could request from the provider the values depicted in the following equation:

$$Y = A(\theta, \phi)S(\tau) + N$$

where value Y holds the azimuth A, elevation angle $\theta,\phi$ and delay information $S(\tau)$ plus N the relevant noise created in the channel. A different approach would be to request from the provider the vectorized value of Y.

As already mentioned, another example would be to request the positioning data in the 3 axis directly from the provider.

Some embodiments can use data provided as described above. With such a set of signal data collected from the provider, a set of 3D points is calculated. For example, such a set of data can be processed by a method described in Qi, C. R., Su, H., Mo, K., & Guibas, L. J. (2017), *Pointnet: Deep learning on point sets for 3d classification and segmentation. In Proceedings of the IEEE conference on computer vision and pattern recognition* from pages 652-660 (https://arxiv.org/pdf/1612.00593.pdf) in order to deduce the shape-gesture that was requested from the user.

According to a preferred embodiment, communication in the step of communicating, by the emergency service, with one or more user(s) end device(s) in the incident area and instructing the one or more user(s) to perform the first gesture with their end device(s) in the air can comprise Short Message Service-Cell Broadcast, CB-SMS, non-interactive SMS, or voice commands from the Interactive voice response (IVR) or the agent, in case the user has an active call with the emergency service.

According to another preferred embodiment, communication in the step of communicating, by the emergency service, with one or more user(s) end device(s) in the incident area and instructing the one or more user(s) to perform the second or any further gesture with their end device(s) in the air comprises Short Message Service-Point to Point (SMS-PP), interactive SMS, interactive data channel, or voice commands from the IVR or the agent, in case the user has an active call with the emergency service.

Further, according to a preferred embodiment, the signal/location data in the step of receiving upon request, by the emergency service, signal and/or location data from a carrier regarding the one or more user(s) end device(s) comprises sounding reference signal (SRS), Uplink Time Difference of Arrival (UTDOA), Enhanced Observed Time Difference (EOTD), location by value (LbV), Advanced Mobile Location (AML).

According to yet another preferred embodiment, the communication can also include a link to open a web page that presents a CAPTCHA puzzle with suggested second and/or any further gestures to be performed by the one or more user(s).

According to yet another preferred embodiment, in the communication step, the method can also include instructing, by the emergency service, the one or more user(s) to perform a secret gesture which is known only by verified user(s) in the corresponding area of the emergency incident.

According to yet another preferred embodiment, in the step receiving upon request, by the emergency service, signal and/or location data from a carrier regarding the one or more user(s) end device(s) can include a predetermined amount of time of 10 seconds, preferably of 5 seconds and most preferably of 3 seconds.

According to yet another preferred embodiment, the method can also include recognizing, by the emergency service, the first, second or any further gesture which was performed by the one or more user(s) end device(s) in the incident area with a similarity of at least 50 percent, preferably of at least 80 percent, and most preferably of at least 90 percent.

According to yet another preferred embodiment, the method can include further setting a predetermined timer value in which the one or more user(s) have to perform the first, second or any further gesture, wherein the predetermined timer value is 60 seconds, preferably 20 seconds and most preferably 10 seconds.

According to yet another preferred embodiment, the communication in the step of communicating, by the emergency service, with one or more user(s) end device(s) in the incident area and instructing the one or more user(s) to perform a second or any further gesture with their end device(s) in the air can include instructing the one or more user(s) to choose a gesture to be performed by presenting the user a CAPTCHA puzzle with different gestures to choose.

A system for exposing malicious mobile activity by exploiting signal-based gestures can also be provided, wherein the system is configured to perform the steps of an embodiment of the method.

According to a preferred embodiment, the system can include a computer device having a processor connected to a non-transitory computer readable medium and at least one transceiver. The computer device can have code stored in the memory that can be run by the process to provide a bot, an artificial intelligence, a computer program, and/or an application to configure the computer device to perform one or more of the steps of the method. The at least one transceiver unit of the computer device can be configured to facilitate communicative connections via a communication network. Some embodiments of the computer device can be configured to communicate with one or more other devices (e.g. by providing a link to obtain requested data from a provider or provider device, wherein these are configured to support the emergency service to perform the steps of the method. The computer device can be a component of an emergency service hosting telecommunication system in some embodiments.

According to yet another aspect, a non-transitory computer readable medium can be provided that has a computer-program element stored thereon, which when being executed by a processor of a computer device or communication device, is adapted to carry out steps of the method defined by the computer-program element (e.g. code). The defined method can be an embodiment of the method for exposing malicious mobile activity by exploiting signal-based gestures.

For example, in some embodiments, a non-transitory memory comprising program code can be provided, which when being executed by a processor is adapted to carry out steps of the method for exposing malicious mobile activity by exploiting signal-based gestures.

A computer-readable medium may be a floppy disk, a hard disk, a USB (Universal Serial Bus) storage device, a RAM (Random Access Memory), a ROM (read only memory) or an EPROM (Erasable Programmable Read Only Memory), a solid state drive, or other type of suitable memory. Embodiments can be adapted for us in connection with at least one data communication network, e.g. the Internet, which may allow downloading a program code, etc. as well.

It has also to be noted that aspects of the invention have been described with reference to different subject-matters. In particular, some aspects or embodiments have been described with reference to apparatus/system type claims whereas other aspects have been described with reference to method type claims. However, a person skilled in the art will gather from the above and the following description that, unless otherwise notified, in addition to any combination between features belonging to one type of subject-matter also any combination between features relating to different types of subject-matters is considered to be disclosed with this text. In particular, combinations between features relating to the apparatus/system type claims and features relating to the method type claims are considered to be disclosed. Further, any embodiments or otherwise described features of the present invention are combinable in any manner by a person skilled in the art unless otherwise explicitly described.

BRIEF DESCRIPTION OF THE DRAWINGS

Exemplary embodiments of the invention thereof will be described below in further detail in connection with the drawing(s). Like reference numbers may refer to like components.

Figure 1:
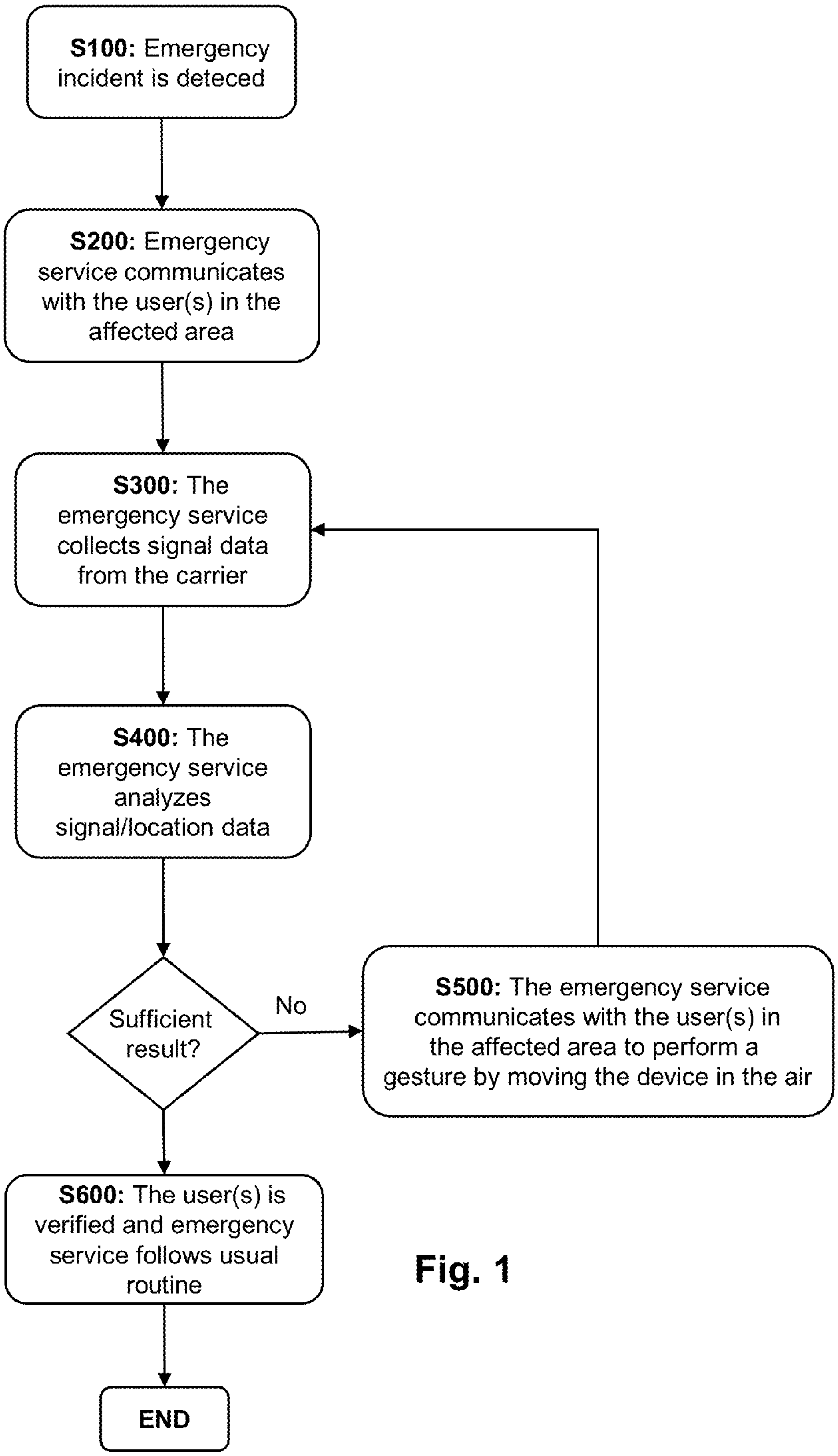
FIG. 1 shows a schematic illustration of a block diagram of the method according to an exemplary embodiment of the invention.

Reference numerals utilized in the drawings include:

UE User equipment;

device_k (mobile) device of a user; and

S100-S600 method steps.

DETAILED DESCRIPTION

FIG. 1 schematically shows in block diagram steps of the method according to one embodiment of the invention. In the first step S100, the emergency services detect an incident. Emergency services and rescue services can be organizations that ensure public safety, security, and/or health by addressing and resolving different emergencies. Some of these agencies exist solely for addressing certain types of emergencies, while others deal with ad hoc emergencies as part of their normal responsibilities. Many of these agencies engage in community awareness and prevention programs to help the public avoid, detect, and report emergencies effectively. Emergency services are often considered first responders, and typically have dedicated emergency vehicles. The emergency services can utilize a telecommunication system to help them detect an incident (e.g. via a caller making an emergency call).

The emergency service can utilize a telecommunication system can include at least one communication device that has a processor connected to a non-transitory computer readable medium and at least one transceiver unit to receive and process calls from user devices via at least one telecommunication network (e.g. the internet, at least one telephone communication network, at least one cellular wireless communication network, a wide area network, etc.). In some embodiments, the telecommunication system can include a call center having a public safety answering point (PSAP) for example. The emergency service telecommunication system can also include one or more call taker devices that can be communicatively connected to the PSAP in some embodiments.

For instance, emergency services have one or more dedicated emergency telephone numbers reserved for critical emergency calls. In many countries, one number is used for all of the emergency services (e.g. 911 in the Americas, 999 in the United Kingdom, 112 in continental Europe, 000 in Australia). Calls made to emergency services to report emergencies are called emergency calls.

This detection of an incident can be done either with a call that arrives at the call center, or with other sources like, for example, social media. In any case, the incident affected area is detected and/or known to the emergency service.

In the second step S200, the call center of the emergency service (e.g. via a bot run via a computer device of the telecommunication system of the emergency service) communicates with the user(s) in the affected area and instructs the user(s) to perform a first gesture in the air with their end device(s), when can be a smartphone, a tablet, or other type of user end device or mobile user end device. In this step, if a call has been received by the emergency service, the agents of the call center follow the normal process. Still, there may be a need that the emergency service communicates a Short Message Service-Cell Broadcast (CB-SMS or SMS-CB) to all the recipients of the affected area, by instructing them to prove if they are safe, affected, etc.

Cell Broadcast (CB) is a method of sending messages to multiple mobile device users in a defined area at the same time. It is defined by the ETSI's (European Telecommunications Standards Institutes) GSM committee and 3GPP (3rd Generation Partnership Project) and is part of the 2G, 3G, 4G LTE (telecommunication) and 5G standards. It is also known as CB-SMS. Unlike Short Message Service-Point to Point (SMS-PP), Cell Broadcast is a one-to-many geo-targeted and geo-fenced messaging service.

In this case, based on one option of an embodiment of the method, the emergency service can send a CB-SMS that will instruct the users to move their devices in the air in order to prove that they are safe. A more specific or generic gesture could be requested, depending on the condition of the emergency incident.

In step S300, the emergency service can request data from the carrier (provider) regarding the examined device(s) for a pre-selected time period (e.g. the last 120 seconds to 180 seconds, etc.). These data can be used in order to identify a set of historical gestures that have been performed by this user within the pre-selected time period (e.g. the last 2-3 minutes, etc.).

In step S400 the emergency service can analyze the signal data to identify if the positioning data inferred from the signal analysis provide enough information to recognize the first gesture which was performed by the one or more user(s) end device(s) in the incident area. This analysis can be performed by the computer device of the emergency service's telecommunication system, for example. If the analysis of the data does not offer a useful result, say, for example, the classification of the first gesture with at least 80 percent similarity, this can be used to take other decisions with regards to the gesture that the user will be instructed to do.

In this respect, in step 500, the emergency service can request from all or specific users to perform a specific second gesture to prove that they are safe. This extra gesture can be used in other cases as well. For example, in case that the emergency service receives an emergency call with location information, e.g., location by value (LbV), in the SIP INVITE request, generated from the device, then the method can be used in order to verify the location information and possibly to expose malicious behavior of a device or a set of devices. Such a request can be communicated via the computer device of the emergency service's telecommunication system, for example.

Different ways can be used to contact the user(s) in the affected area. For example, in case it is an abandoned call, the call center (e.g. a bot) can send a second gesture instruction using an SMS. In a different case, the active voice stream can be used to direct the user. Further, a CAPTCHA solution can be deployed with the aim to offer the user the possibility to select a specific first and/or second gesture. For example, based on conditions in the step S300, the emergency service (e.g. bot) can receive useful data regarding the user device. In such a case, the data analysis can indicate that this device has performed 3 different first gestures in the at least last 120-180 seconds (e.g. the gestures correspond to a circle, a rectangle, and a triangle). Holding in mind that even the data analysis does not indicate something, the emergency service (e.g. bot) can select a number of random shapes, say the most common shapes (e.g. circle, triangle, etc.) as second gesture to be performed.

Using these data, in step S500, the emergency service (e.g. bot) can send a CAPTCHA puzzle to the user device using an interactive SMS, or any other interactive data channel, using the three previous first gestures. Keep in mind that the aforementioned solution can be applied both in the case where the call is abandoned or active. The user selects the gesture that he/she wants to perform, and the interactive SMS mechanism sends back to the emergency service (e.g. bot) the response. In case the classification identifies different gestures performed by the user, for example, gestures g1, g2, or g3, compared to the requested gesture g0, then the emergency service (e.g. bot) can use those gestures in a later step, say using an interactive SMS mechanism, so that it can be proposed to the user to perform one of the gestures g1, g2, or g3. This is done because the user was requested to perform a specific gesture and failed. This could be the result of an accident and the positioning of the user. Thus, it would be better to propose to the user to perform one of the gestures g1, g2, or g3 instead of g0. With this approach, it can be assumed that the second time the performed gesture will be validated with at least 80% similarity. This response can also be used in order to get the user consent about the second gesture that will be performed. In essence step S500 is used as an additional verification step for the user choices.

By executing again in step S300, the emergency service (e.g. bot) will send a request to the carrier in order to retrieve data related to the examined device. With the analysis of these data (repeated step S400) the emergency service (e.g. bot) can identify if the user has moved the device in the requested way. This can be done using specific timers so that it can be avoided that the user will wait too long for the system to decide. For example, if the process consumes more than 120 seconds (or other pre-selected time period), the proposed method will terminate, and other security mechanisms can be used to verify the caller.

In the step S400 (repeated), the emergency service (e.g. bot run on a computer device as noted above) can analyze the data and infer that the user device has formed the second gesture with at least a similarity of at least 80 percent or other pre-selected similarity threshold, identifying the user of this device as non-malicious.

In the final step S600, the emergency service (e.g. bot run on a computer device as noted above) verifies that one or more user(s) in the incident area are non-malicious and proceeds with standard emergency handling, if the signal analysis provides enough information to recognize the first gesture, the second or any further gesture. Otherwise, the steps S500, S300 and S400 can be repeated, or other further security mechanisms can take place to specify the UE as either robocalls or as real human persons.

In case the provider cannot provide signal data but only position data points for the last k seconds (e.g. a pre-selected period of time), it can be inferred that the second shape (gesture) is based on these points. In this case, signal data may not be used but can be applied directly in the location data provided by the carrier.

Figure 2:
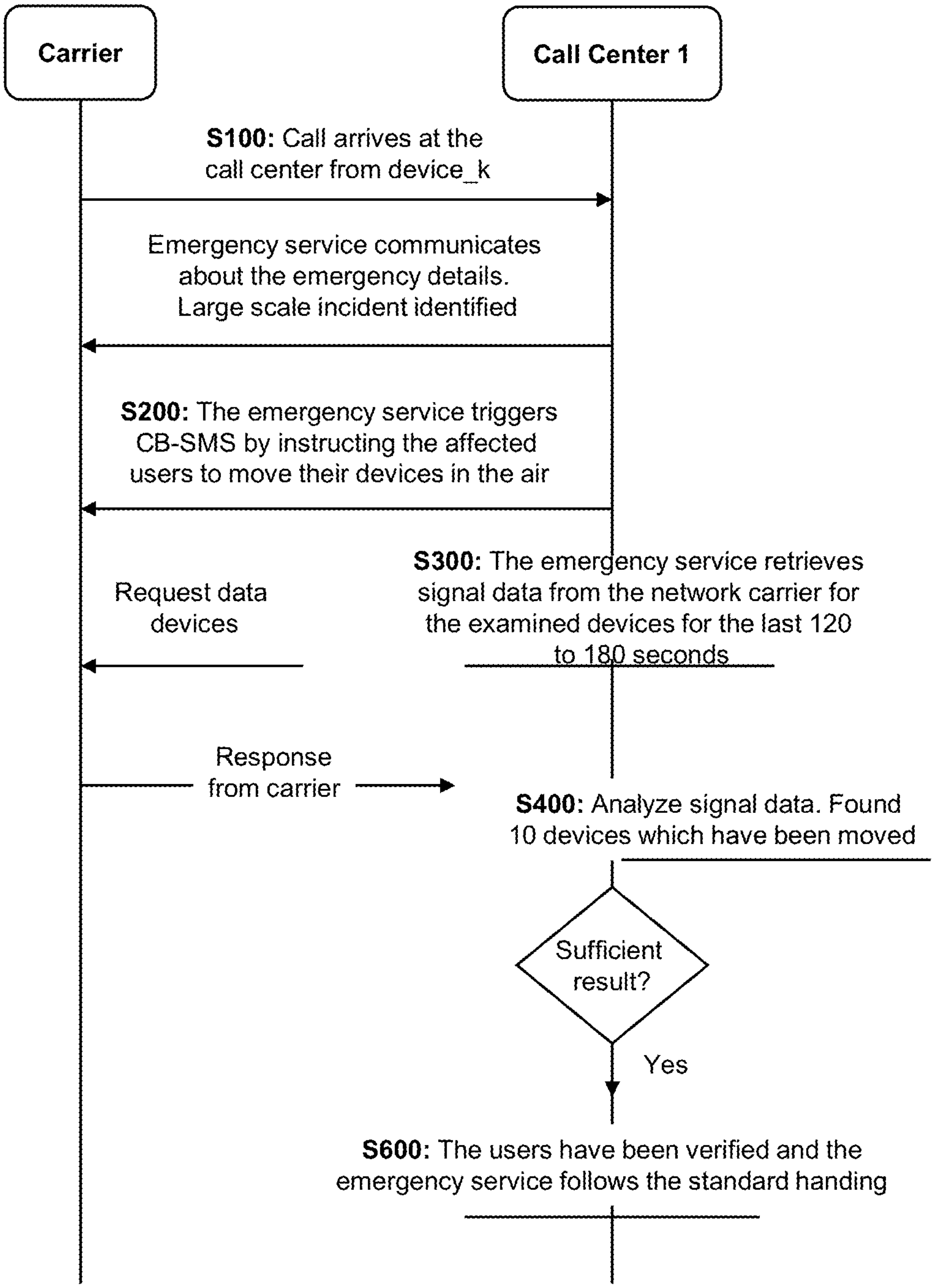
FIG. 2 shows a flowchart for the case where the method is to monitor victims in an affected emergency incident area according to another exemplary embodiment of the invention.

FIG. 2 shows a flowchart for the case where the method is to monitor victims in an affected emergency incident area. In this flowchart, the situation is described where a caller (in FIG. 2 associated with device_k) has an active audio/text/video call with the call center. In this case, the emergency service receives the information that a large-scale incident affects an area from an incoming call at step S100. In case of a large-scale emergency incident that affects a big area, like, for example, a wildfire, an earthquake, etc. or an area where many people are involved, like a pile up with various cars, etc., respective emergency service can send a CB-SMS which directs the users to move their devices in a specific way, so that the emergency service can identify which of them may need help, or infer which of them may be victims (see step S200 in FIG. 2). So, an easy way to check approximately how many people may be affected is to trigger a CB-SMS from the emergency service to the users in this area. The users are instructed with the SMS to move their devices in the air and perform a first gesture.

The emergency service sends a request to the provider or carrier in order to receive signal data for the devices in the affected area for the last 120 to 180 seconds of activity (depicted as step S300 in FIG. 2).

The service analyzes the data and identifies that there are 10 users moving their device indicating that everything is fine (S400). In case of these 10 devices which have been moved, the emergency service follows its standard handling (S600). The rest of the found devices where no movement was detected can be identified as possible users that may need assistance and can be prioritized by the emergency service, meaning the emergency service sends forces first to these specific users that have not been moved or that have not moved their device. Or in a different way, the emergency service picks or focuses first on those devices which have not moved at all. This could be a sign that people are affected by the incident, may be unconscious, etc.

Figure 3:
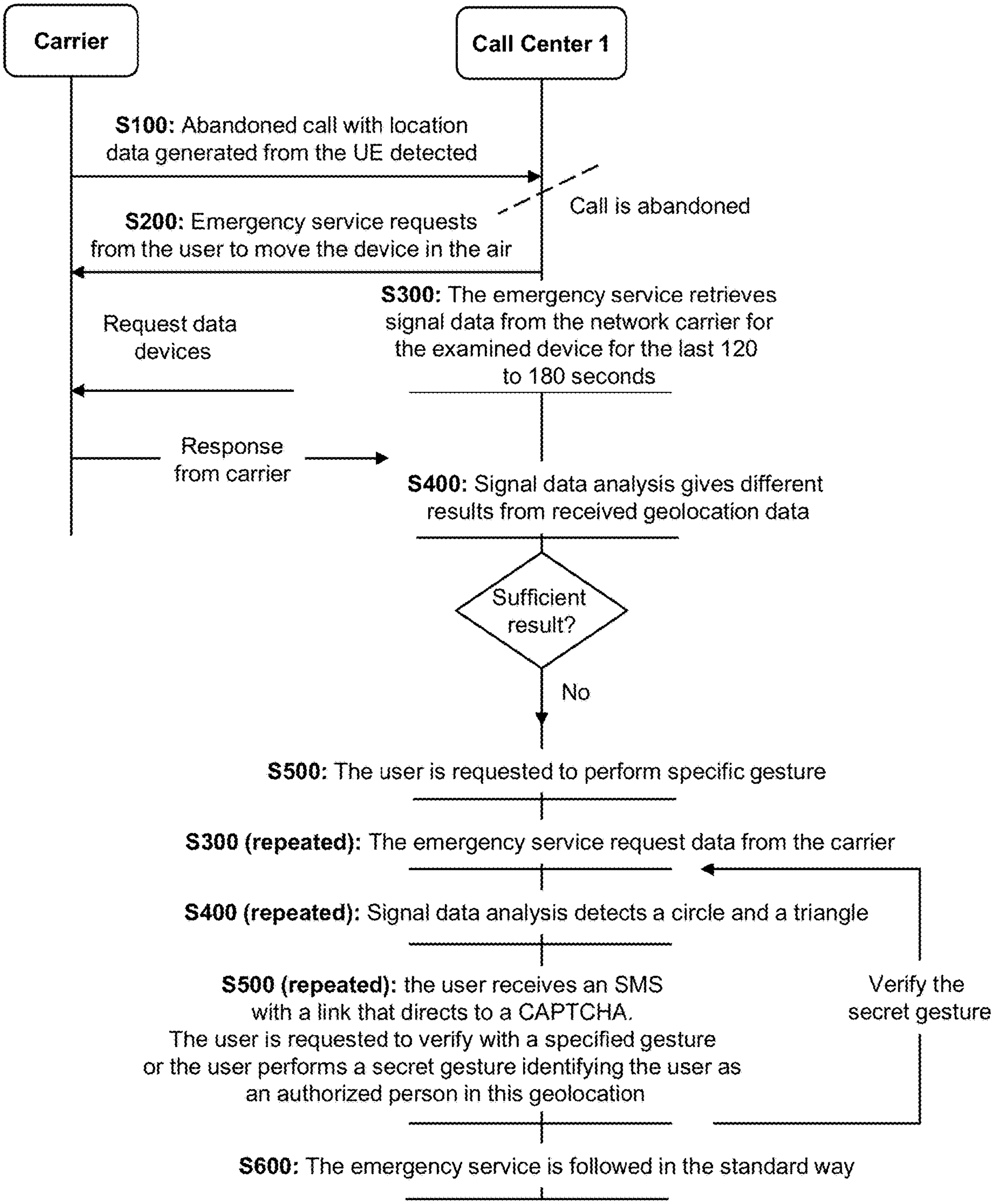
FIG. 3 shows a flowchart for the case where the method is to verify if an abandoned call comprises fake geolocation data according to another exemplary embodiment of the invention.

FIG. 3 shows a flowchart for the case where the method is to verify if an abandoned call comprises fake geolocation data indicating that such a call might be an unwanted robocall. In this situation, a call is received with location information, for example, in the SIP body or via Advanced Mobile Location (AML) sent by the user device (UE) and is abandoned (see FIG. 3, step S100). Advanced Mobile Location (AML) is a free-of-charge emergency location-based service (LBS) available on smartphones that, when a caller dials the local (in country) short dial emergency telephone number, sends the best available geolocation of the caller to a dedicated endpoint, usually a public safety answering point (PSAP), making the location of the caller available to emergency call takers in real-time. AML improves the time taken by emergency call takers to verify the location of callers and can improve the time taken to dispatch an emergency response. AML is a protocol to transport data with SMS and/or HTTPS from the phone to the emergency call center in all countries that have deployed AML. AML is not an application and does not require any action from the caller. AML is supported in many countries, and by all smartphones running recent versions of Android or iOS, although it can be disabled in user settings.

The emergency service follows the same steps as described in the previous embodiment in FIG. 2, but in step S200 it sends only a non-interactive SMS which instructs the user(s) to move the device(s) in the air. This non-interactive SMS can be a single SMS which requests from the user(s) to perform the gesture. After 60 seconds in step S300, the emergency service (e.g. in form of a bot) sends a request to the carrier in order to get a fresh set of data related to the devices. In step S400, the emergency service performs an analysis which does not show the expected results regarding the device because the location data received in the abandoned call do not match the signal data with respect to the location of the user, in particular the user's device. In step S500, the emergency service instructs the user to perform a specific second gesture.

The emergency service receives again fresh data from the carrier upon requesting it (repeated step S300). After analyzing these data (repeated step S400), the emergency service identifies however two different gestures that have been performed by the device in the last 60 seconds. For example, a circle gesture and a triangle gesture.

The emergency service wants to further investigate this, so in step S500 (repeated), it sends now an interactive SMS to the user with a link. The user needs to click on the link in order to open a web page that presents a CAPTCHA puzzle. The CAPTCHA presents two figures, e.g. a circle and a triangle (inferred from the data collected from repeated step S300). The user is requested to select one of these provided gestures. After the user verifies which gesture he/she would like to perform, he/she moves the device in the air in this specific way, in order to form this specified gesture.

Optionally, the emergency services can instruct the user to perform a secret gesture. The shape corresponds to a secret gesture which is known only by verified people in the corresponding geolocation, say, for example, the security personnel of a building. In this indirect way, the emergency service will be able not only to classify the motion of a mobile device as human activity, but also to authorize the holder of the device which performed a secret gesture.

Again, step S300 is repeated, the emergency service sends a request to the carrier in order to receive update information related to device. This is done in order to receive a fresh set of data related to the device so as to deduce if the user has performed the gesture that has been requested. In repeated step S400, the emergency service analyzes the data and identifies if the gesture has been performed with at least 80 percent similarity.

Then in the last step S600, if the gesture is verified, the emergency service (e.g. bot) connects the caller to the call taker of the call center or PSAP.

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

It should also be appreciated that different embodiments of the method, communication system, communication apparatus, and non-transitory computer readable medium can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, computer device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for exposing malicious mobile activity by exploiting signal-based gestures, wherein the method comprising the steps of:

detecting, by an emergency service, an emergency incident in an area;

communicating, by the emergency service, with one or more user end devices in the incident area to instruct one or more users of the one or more user end devices to perform a first gesture with the one or more user end devices;

requesting by the emergency service, signal and/or location data from a carrier regarding the one or more user end devices for a predetermined amount of time to receive the signal and/or location data from the carrier;

analyzing, by the emergency service, the signal and/or location data received from the carrier to identify whether positioning data inferred from the analyzing of the signal and/or location data provide enough information to recognize that the first gesture was performed by the one or more user end devices in the incident area;

communicating, by the emergency service, with one or more user end devices in the incident area to perform a second gesture or any further gesture by moving the one or more user end devices in response to the analyzing of the signal and/or location data indicating that there is insufficient information to recognize the first gesture; and verifying, by the emergency service, the one or more users of the one or more user end devices in the incident area as non-malicious in response to the analyzing of the signal and/or location data indicating that the first gesture was performed to proceed with emergency handling.

2. The method of claim 1, comprising:

communicating, by the emergency service, with one or more user end devices in the incident area and instructing one or more users of the one or more user end devices to perform the second gesture with the one or more user end devices;

requesting by the emergency service, signal and/or location data from a carrier regarding the one or more user end devices for a predetermined amount of time to receive the signal and/or location data from the carrier after the instructing of the one or more users to perform the second gesture occurred;

analyzing, by the emergency service, the signal and/or location data received by the carrier to identify whether the positioning data inferred from the analyzing of the signal and/or location data provide enough information to recognize that the second gesture was performed by the one or more user end devices in the incident area.

3. The method of claim 1, wherein the communicating, by the emergency service, with the one or more user end devices in the incident area to instruct the one or more users of the one or more user end devices to perform the first gesture with the one or more user end devices comprises sending a Short Message Service-Cell Broadcast (CB-SMS) message, a non-interactive SMS message, and/or voice commands.

4. The method of claim 1, wherein the communicating, by the emergency service, with the one or more user end devices in the incident area to perform the second gesture or any further gesture by moving the one or more user end devices comprises sending a Short Message Service-Point to Point (SMS-PP) message, an interactive SMS message, an interactive data channel, and/or voice commands.

5. The method of claim 1, wherein the signal data and/or location data comprises sounding reference signal (SRS) data, Uplink Time Difference of Arrival (UTDOA) data, Enhanced Observed Time Difference (EOTD) data, location by value (LbV) data and/or Advanced Mobile Location (AML) data.

6. The method of claim 1, wherein the communicating, by the emergency service, with the one or more user end devices in the incident area to perform the second gesture or any further gesture by moving the one or more user end devices comprises sending a link to open a web page that presents a CAPTCHA puzzle to identify the second gesture and/or further gesture to be performed by the one or more users.

7. The method of claim 1, wherein the communicating, by the emergency service, with the one or more user end devices in the incident area to perform the second gesture or any further gesture by moving the one or more user end devices comprises instructing, by the emergency service, that the one or more users perform a secret gesture which is known only by verified user(s) in the incident area.

8. The method of claim 1, wherein the predetermined amount of time is between 10 seconds and 3 seconds.

9. The method of claim 1, comprising:

recognizing, by the emergency service, the first gesture based on the analyzing, by the emergency service, of the signal and/or location data received from the carrier identifying a similarity to the first gesture of at least 50 percent.

10. The method of claim 1, comprising:

recognizing, by the emergency service, the first gesture based on the analyzing, by the emergency service, of the signal and/or location data received from the carrier identifying a similarity to the first gesture of at least 80 percent.

11. The method of claim 1, comprising:

recognizing, by the emergency service, the first gesture based on the analyzing, by the emergency service, of the signal and/or location data received from the carrier identifying a similarity to the first gesture of at least 90 percent.

12. The method of claim 1, comprising:

further setting a predetermined timer value in which the one or more users have to perform the first gesture, wherein the predetermined timer value is between 180 seconds and greater than or equal to 5 seconds.

13. The method of claim 1, comprising:

further setting a predetermined timer value in which the one or more users have to perform the first gesture, wherein the predetermined timer value is between 60 seconds and greater than or equal to 10 seconds.

14. The method of claim 1, wherein the communicating, by the emergency service, with the one or more user end devices in the incident area to perform the second gesture or any further gesture by moving the one or more user end devices comprises instructing the one or more users to choose a gesture to be performed by presenting the user a CAPTCHA puzzle with different pre-selected gestures to choose.

15. A communication system for exposing malicious mobile activity by exploiting signal based gestures, comprising:

a computer device communicatively connectable to one or more user end devices, the computer device having a processor communicatively connectable to a non-transitory computer readable medium such that code stored in the non-transitory computer readable medium is runnable by the processor so that the computer device is configured to:

communicate with the one or more user end devices to instruct one or more users of the one or more user end devices to perform a first gesture with the one or more user end devices;

request signal and/or location data from a carrier regarding the one or more user end devices for a predetermined amount of time to receive the signal and/or location data from the carrier;

analyze the signal and/or location data received from the carrier to identify whether positioning data inferred from the analyzing of the signal and/or location data provide enough information to recognize that the first gesture was performed;

communicate with the one or more user end devices to perform a second gesture by moving the one or more user end devices in response to analysis of the signal and/or location data indicating that there is insufficient information to recognize the first gesture; and verify the one or more users of the one or more user end devices as non-malicious in response to the analysis of the signal and/or location data indicating that the first gesture was performed to proceed with emergency handling.

16. The system of claim 15, wherein the code defines a bot, an artificial intelligence, a computer program, or an application.

17. The system of claim 15, also comprising the one or more user end devices, the one or more user end devices including at least one smartphone.

18. The system of claim 15, wherein the computer device is a public safety answering point or is communicatively connectable to a public safety answering point.

19. A non-transitory computer readable medium having code stored thereon that is executable by a processor of a communication device, the communication device performing a method defined by the code when the processor executes the code, the method comprising:

communicating with one or more user end devices in an incident area to instruct one or more users of the one or more user end devices to perform a first gesture with the one or more user end devices;

requesting signal and/or location data from a carrier regarding the one or more user end devices for a predetermined amount of time to receive the signal and/or location data from the carrier;

analyzing the signal and/or location data received from the carrier to identify whether positioning data inferred from the analyzing of the signal and/or location data provide enough information to recognize that the first gesture was performed by the one or more user end devices in the incident area;

communicating with the one or more user end devices in the incident area to perform a second gesture by moving the one or more user end devices in response to the analyzing of the signal and/or location data indicating that there is insufficient information to recognize the first gesture; and verifying the one or more users of the one or more user end devices in the incident area as non-malicious in response to the analyzing of the signal and/or location data indicating that the first gesture was performed.

* * * * *